(12) United States Patent
Choi et al.

(10) Patent No.: US 10,340,500 B2
(45) Date of Patent: Jul. 2, 2019

(54) POUCH BATTERY HAVING IMPROVED OVERCHARGING SAFETY

(71) Applicant: HYUNDAI MOTOR COMPANY, Seoul (KR)

(72) Inventors: Sung Min Choi, Gyeongju-si (KR); Ik Kyu Kim, Seoul (KR); Seung Ho Ahn, Hanam-si (KR); Hong Seok Min, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 959 days.

(21) Appl. No.: 14/815,821

(22) Filed: Jul. 31, 2015

(65) Prior Publication Data

US 2016/0211502 A1    Jul. 21, 2016

(30) Foreign Application Priority Data

Jan. 20, 2015  (KR) .................. 10-2015-0009347

(51) Int. Cl.
*H01M 2/34* (2006.01)
*H01M 2/02* (2006.01)
*H01M 2/12* (2006.01)

(52) U.S. Cl.
CPC ......... *H01M 2/345* (2013.01); *H01M 2/0275* (2013.01); *H01M 2/1241* (2013.01); *H01M 2200/20* (2013.01)

(58) Field of Classification Search
CPC .. H01M 2/027; H01M 2/1229; H01M 2/1241; H01M 2/345; H01M 2200/20; H01M 2/305; H01M 2220/20; H01M 10/0525; H01M 2/0275; Y02E 60/122

USPC .......................................... 429/61
See application file for complete search history.

(56) References Cited

U.S. PATENT DOCUMENTS

| 8,828,598 B2 | 9/2014 | Nakai |
| 2010/0233529 A1 | 9/2010 | Nansaka et al. |
| 2011/0008654 A1* | 1/2011 | Kim ............. H01M 2/022 429/56 |
| 2012/0003517 A1 | 1/2012 | Choi et al. |

(Continued)

FOREIGN PATENT DOCUMENTS

| JP | 2010-211927 A | 9/2010 |
| JP | 2013-54915 A | 3/2013 |

(Continued)

OTHER PUBLICATIONS

Korean Notice of Allowance dated Dec. 5, 2016 issued in Korean Patent Application No. 10-2015-0009347.

*Primary Examiner* — Milton I Cano
*Assistant Examiner* — Abibatu O Ojo-Amoo
(74) *Attorney, Agent, or Firm* — Morgan Lewis & Bockius LLP

(57) ABSTRACT

A pouch battery having improved overcharging safety includes a CID interrupting an electrical connection between an electrode assembly and a lead tab when the pouch is expanded. When the pouch is expanded, the CID discharges gas generated inside the pouch to the outside, and at the time of overcharging a secondary battery, the CID interrupts a flow of current introduced into the secondary battery and discharges the gas generated due to the overcharging to the outside of the pouch, thereby reducing an ignition risk and improving the overcharging safety.

13 Claims, 4 Drawing Sheets

(56) References Cited

U.S. PATENT DOCUMENTS

| | | | |
|---|---|---|---|
| 2012/0040235 A1 | 2/2012 | Cho et al. | |
| 2013/0136959 A1* | 5/2013 | Baek | H01M 2/1252 429/54 |
| 2013/0309530 A1* | 11/2013 | Shim | H01M 2/1686 429/61 |
| 2015/0072185 A1 | 3/2015 | Cho et al. | |
| 2015/0180015 A1* | 6/2015 | Ahn | H01M 2/345 429/178 |

FOREIGN PATENT DOCUMENTS

| | | |
|---|---|---|
| JP | 5344048 B2 | 11/2013 |
| KR | 10-2001-0061299 A | 7/2001 |
| KR | 10-0864694 B1 | 10/2008 |
| KR | 10-2011-0048470 A | 5/2011 |
| KR | 10-1136274 B1 | 4/2012 |
| KR | 10-1252981 B1 | 4/2013 |
| KR | 10-2013-0057756 A | 6/2013 |
| KR | 10-1327123 B1 | 11/2013 |
| KR | 10-2014-0002115 A | 1/2014 |
| KR | 10-2014-0049748 A | 4/2014 |
| KR | 10-2014-0058953 A | 5/2014 |

* cited by examiner

POUCH BATTERY HAVING IMPROVED OVERCHARGING SAFETY

CROSS-REFERENCE TO RELATED APPLICATION

This application is based on and claims the benefit of priority to Korean Patent Application No. 10-2015-0009347, filed on Jan. 20, 2015 in the Korean Intellectual Property Office, the disclosure of which is incorporated herein in its entirety by reference.

TECHNICAL FIELD

The present disclosure relates to a pouch battery having improved overcharging safety, and more particularly, to a pouch battery having improved overcharging safety capable of discharging gas generated inside a pouch at the time of overcharging to the outside so as to reduce an ignition risk due to the overcharging.

BACKGROUND

When abnormal extra charging (overcharging) is generated while a secondary battery is charged, a voltage of the battery exceeds a normal range and the battery becomes an instable source of energy.

In such cases, an electrolytic solution, which generates gas, is decomposed inside the battery. The generated gas which is flammable gas has an extremely high ignition risk.

Meanwhile, with the recent demand for a high energy battery, the size and capacity of secondary batteries have been increased correspondingly. As a result, when a secondary battery with increased size and capacity is overcharged, a technology to lower the ignition risk is required.

SUMMARY

The present disclosure has been made to solve the above-mentioned problems occurring in the prior art while advantages achieved by the prior art are maintained intact.

An aspect of the present disclosure provides a pouch battery having improved overcharging safety, capable of cutting off a flow of current introduced into a secondary battery to stop overcharging at the time of occurrence of the overcharging and effectively removing gas generated during the overcharging.

According to an exemplary embodiment of the present disclosure, a pouch battery having improved overcharging safety includes an electrode assembly configured to include a cathode plate and an anode plate; a pouch configured to receive the electrode assembly; a connecting terminal configured to be electrically connected to or disconnected from the electrode assembly; a lead tab configured to be electrically connected to the connecting terminal and extending toward an outside of the pouch; and a current interrupt device (CID) configured to be received in the pouch and have a shape changed according to a change in internal pressure of the pouch to separate the connecting terminal from the electrode assembly.

The current interrupt device (CID) interrupts an electrical connection between the electrode assembly and the lead tab when the pouch is expanded, and discharges gas generated inside the pouch to the outside.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Exemplary embodiments of the present disclosure will be described in detail with reference to the accompanying drawings.

Figure 1:
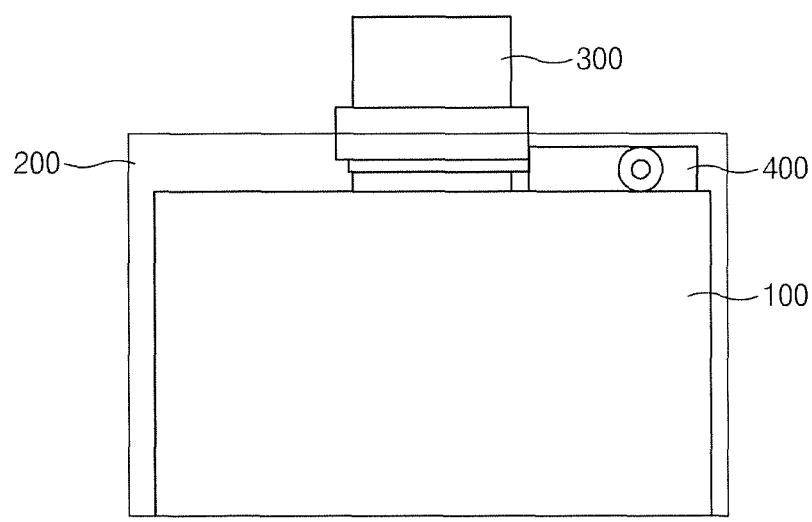
FIG. 1 is a diagram showing a plan perspective view of main parts of a pouch battery having improved overcharging safety, according to an exemplary embodiment of the present disclosure.
Figure 2:
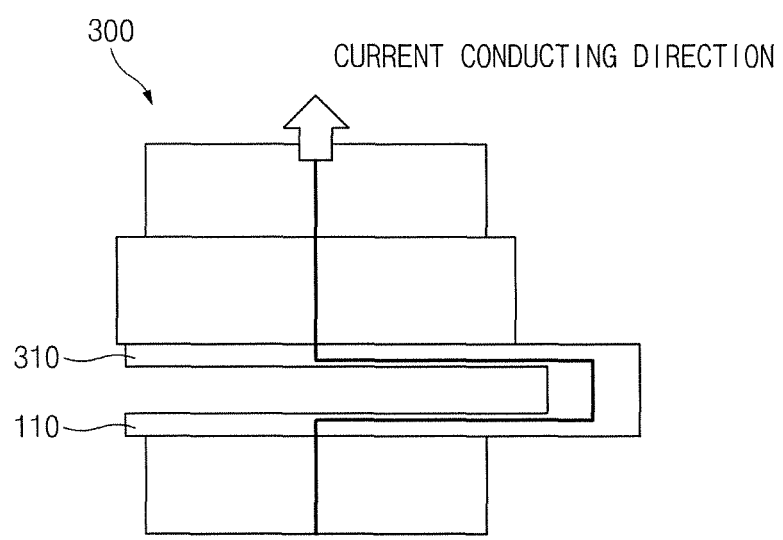
FIG. 2 is a diagram showing a plan view of the main parts of the pouch battery of FIG. 1, having improved overcharging safety.
Figure 3:
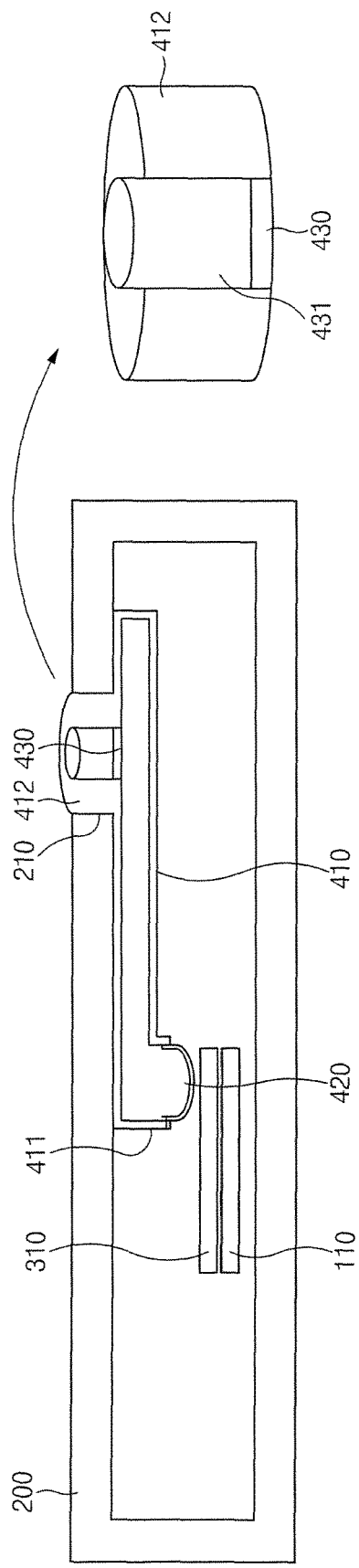
FIG. 3 is a diagram showing a cross-sectional view of the main parts of the pouch battery of FIG. 1, having improved overcharging safety.
Figure 4:
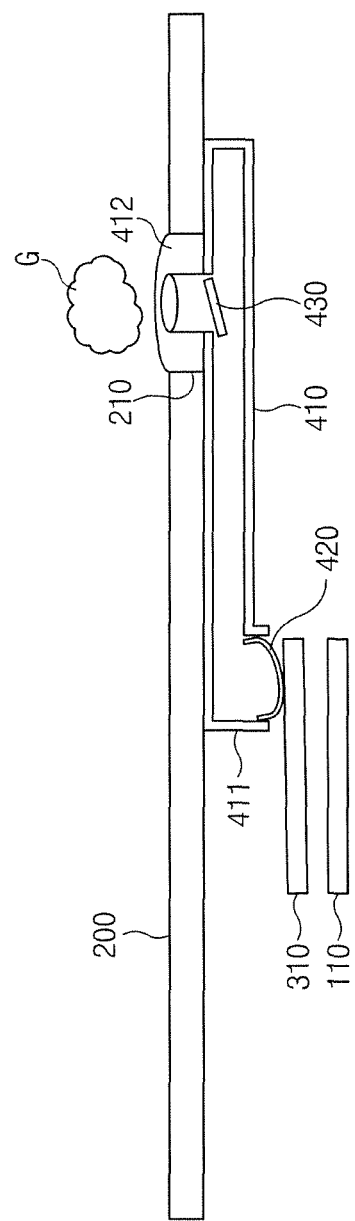
FIG. 4 is a diagram of a cross-sectional view of other main parts of the pouch battery of FIG. 1, having improved overcharging safety.

As illustrated in FIGS. 1 to 4, a pouch battery having improved overcharging safety includes an electrode assembly 100 including an anode plate and a cathode plate, a pouch 200 receiving the electrode assembly 100, connecting terminals 110 and 310 electrically connected to or disconnected from the electrode assembly 100, a lead tab 300 electrically connected to the connecting terminals 110 and 310 and extending to an outside of the pouch 200, and a current interrupt device (CID) 400 received in the pouch 200 and having a shape changing according to a change in an internal pressure of the pouch 200 to separate the connecting terminals 110 and 310 from each other.

Further, gas G generated inside the pouch 200 is discharged to the outside of the pouch 200 through CID 400.

The electrode assembly 100 and the lead tab 300 are electrically connected to each other through the connecting terminals 110 and 310. According to the exemplary embodiment of the present disclosure, the connecting terminals 110 and 310 are configured of the first connecting terminal 110 extending from the electrode assembly 100 and the second connecting terminal 310 extending from the lead tab 300. The first connecting terminal 110 contacts the second connecting terminal 310 to electrically connect between the electrode assembly 100 and the lead tab 300.

The electrode assembly 100 is manufactured in a jelly roll form in which a separator is interposed between the cathode plate and the anode plate. The cathode plate, the anode plate, and the separator are wound.

The CID 400 includes a body 410, a first door 420 mounted in the body 410, and a second door 430 formed in the body 410. The body 410 is a three-dimensional object which may form a predetermined space inside the pouch 200. The body 410 is provided with a first port 411 protruding toward an inside of the pouch 200 and a second port 412 protruding toward the outside of the pouch 200.

The first door 420 is fixed to the second connecting terminal 310. Further, the first door 420 is contracted toward an inner side of the body 410 with the increase in internal pressure of the pouch 200 to be mounted in the first port 411 so that the inside of the pouch 200 connects to the inside of the body 410.

The first door 420 is manufacture to have a U-letter shape and has an opened upper end adhering to an inner side of the first port 411 and a closed lower end adhering to the second connecting terminal 310. In this case, a non-adhering portion is preferably formed between the first door 420 and the first port 411.

The first door 420 presses the second connecting terminal 310 toward the first connecting terminal 110 by the internal pressure of the body 410 and the second connecting terminal 310 is manufactured to have an elastic force toward an opposite direction to the pressed direction of the first door 420.

The second door 430 is formed at the second port 412. The second door 430 is fractured with the increase in internal M pressure of the body 410 and thus the inside of the body 410 connects to the outside of the pouch 200. The second port 412 is mounted in a through hole 210 which is formed in the pouch 200.

According to the exemplary embodiment of the present disclosure, the second door 430 is a valve which is formed inside the second port 412. The second door 430 is provided with a fracture guide groove 431 opened toward the outside of the pouch 200. The guide groove 431 is formed along an inner side wall of the second port 412 and a contact portion of the second door 430.

After the pouch 200 type battery is manufactured, the internal pressure of the pouch 200 is adjusted down enough to be in a vacuum state and therefore the internal pressure of the pouch 200 is lower than that of the body 410. Therefore, the first door 420 and the second door 430 keep a normal state in which they are not contracted or fractured and close the first port 411 and the second port 412.

At the time of the overcharging, gas G is generated inside the pouch 200 and the inside of the pouch 200 is pressed. Further, the pouch 200 is expanded. Therefore, the internal pressure of the pouch 200 becomes higher than that of the body 410.

In this case, the first door 420 is contracted toward the inside of the body 410 having a relatively lower internal pressure. Therefore, delivery of the internal pressure of the body 410 pressing the second connecting terminal 310 disappears and the second connecting terminal 310 is applied with the elastic force toward the opposite direction of the internal pressure of the body 410. The position of the second connecting terminal 310 moves toward the first port 411 by the elastic force of the second connecting terminal 310. In this case, the second connecting terminal 310 is separated from the first connecting terminal 110 and the electrical connection between the electrode assembly 100 and the lead tab 300 is released.

Meanwhile, as the internal pressure of the pouch 200 becomes higher than that of the body 410, inside of the body 410 is pressed by the increased internal pressure of the pouch 200. The second door 430 is fractured by the increased internal pressure of the body 410 and the outside of the pouch 200 connects to the inside of the body 410. Thereby, the gas discharge path which is connected with the inside of the pouch 200, the first port 411, inside of the body 410, the second port 412, and outside of the pouch 200 is formed.

The timing when the second door 430 is fractured by the increased internal pressure of the body 410 is preferably earlier than the timing when the first door 420 is contracted toward the inside of the body 410. The reason is that when the first door 420 is contracted, movement of current to the electrode assembly 100 is blocked and thus the additional rising of the gas pressure does not occur, such that the internal pressure of body 410, enough to fracture the second door 430, may not be formed.

As described above, according to the pouch battery having improved overcharging safety in accordance with the exemplary embodiments of the present disclosure, it is possible to lower the ignition risk by cutting off the flow of current introduced into the secondary battery at the time of overcharging the secondary battery and discharging the generated gas due to the overcharging to the outside of the pouch.

Further, the known CID has been researched to be applied to square shaped and cylindrical secondary battery, however the CID applied to the present disclosure is applied to the pouch type battery.

Further, the known technologies for interrupting the overcharging which have been applied to the known pouch type batteries are limited to the safety mechanism in the battery module unit or the battery package unit. However, the present disclosure may secure the safety in the battery cell unit. In other words, the safety of each battery cell configuring the battery module or the battery package is improved, such that the safety of the battery module and the battery package may be improved.

Further, the present disclosure forms the gas discharge path in the CID and discharges the gas generated by the reaction inside the battery through the gas discharge path. Therefore, it is possible to minimize the configuration for achieving the object and minimize the number of parts.

As described above, although the present disclosure has been described with reference to exemplary embodiments and the accompanying drawings, it would be appreciated by those skilled in the art that the present disclosure is not limited thereto but various modifications and alterations might be made without departing from the scope defined in the following claims.

What is claimed is:

1. A pouch battery having improved overcharging safety, comprising:
    an electrode assembly configured to include a cathode plate and an anode plate;
    a pouch configured to receive the electrode assembly;
    a connecting terminal configured to be electrically connected to or disconnected from the electrode assembly;
    a lead tab configured to be electrically connected to the connecting terminal and extending toward an outside of the pouch; and
    a current interrupt device (CID) configured to be received in the pouch and have a shape changed according to a change in an internal pressure of the pouch to separate the connecting terminal from the electrode assembly,
    wherein the CID includes a body having:
        a first port configured to allow communication between an internal space of the pouch and an internal space of the body; and
        a second port configured to allow communication between the internal space of the body and the outside of the pouch,
    wherein the first port is configured to be opened by a difference between the internal pressure inside the internal space of the pouch and an internal pressure inside the internal space of the body, and
    wherein the second port is configured to be opened by a difference between the internal pressure inside the internal space of the body and an external pressure in the outside of the pouch.

2. The pouch battery according to claim 1, wherein the first port has a first door which closes the first port and which is contracted toward internal space of the body to open the first port with an increase in the internal pressure inside the internal space of the pouch.

3. The pouch battery according to claim 2, wherein the second port has a second door which closes the second port and which is fractured to open the second port with an increase in the internal pressure inside the internal space of the body.

4. The pouch battery according to claim 3, wherein the second door and the first door are configured such that when the second door is fractured, the first door is contracted toward the internal space of the body, with the increase in the internal pressure inside the internal space of the pouch.

5. The pouch battery according to claim 2, wherein the connecting terminal is connected to the first door and separated from the electrode assembly when the first door is contracted toward the internal space of the body.

6. The pouch battery according to claim 2, wherein the first door has a U-letter shape, an opened upper end adhering to an inner side of the first port, and a closed lower end adhering to the connecting terminal.

7. The pouch battery according to claim 6, wherein the first door presses the connecting terminal through the internal pressure inside the internal space of the body, and the connecting terminal has an elastic force toward an opposite direction to a pressing direction of the first door.

8. The pouch battery according to claim 6, wherein a non-adhering portion is present between the first door and the first port.

9. The pouch battery according to claim 3, wherein the second port is mounted in a through hole formed in the pouch, and the second door is a valve formed at an inner side of the second port.

10. The pouch battery according to claim 9, wherein the second door has a fracture guide groove opened toward the outside of the pouch.

11. The pouch battery according to claim 10, wherein the guide groove is formed along an inner side wall of the second port and a contact portion of the second door.

12. A pouch battery having improved overcharging safety, comprising:
an electrode assembly configured to include a cathode plate and an anode plate;
a pouch configured to form an appearance of the electrode assembly;
a lead tab configured to be mounted in the pouch to electrically connect between the electrode assembly and an outside of the pouch; and
a current interrupt device (CID) configured to electrically connect or disconnect between the electrode assembly and the lead tab and discharge gas generated inside the pouch to the outside of the pouch,
wherein the CID includes a body having:
a first port configured to allow communication between an internal space of the pouch and an internal space of the body; and
a second port configured to allow communication between the internal space of the body and the outside of the pouch,
wherein the first port is configured to be opened by a difference between the internal pressure inside the internal space of the pouch and an internal pressure inside the internal space of the body, and
wherein the second port is configured to be opened by a difference between the internal pressure inside the internal space of the body and an external pressure in the outside of the pouch.

13. The pouch battery according to claim 12, wherein the electrode assembly and the lead tab are electrically connected to each other by contact between a first connecting terminal extending from the electrode assembly and a second connecting terminal extending from the lead tab.

* * * * *